UNITED STATES PATENT OFFICE.

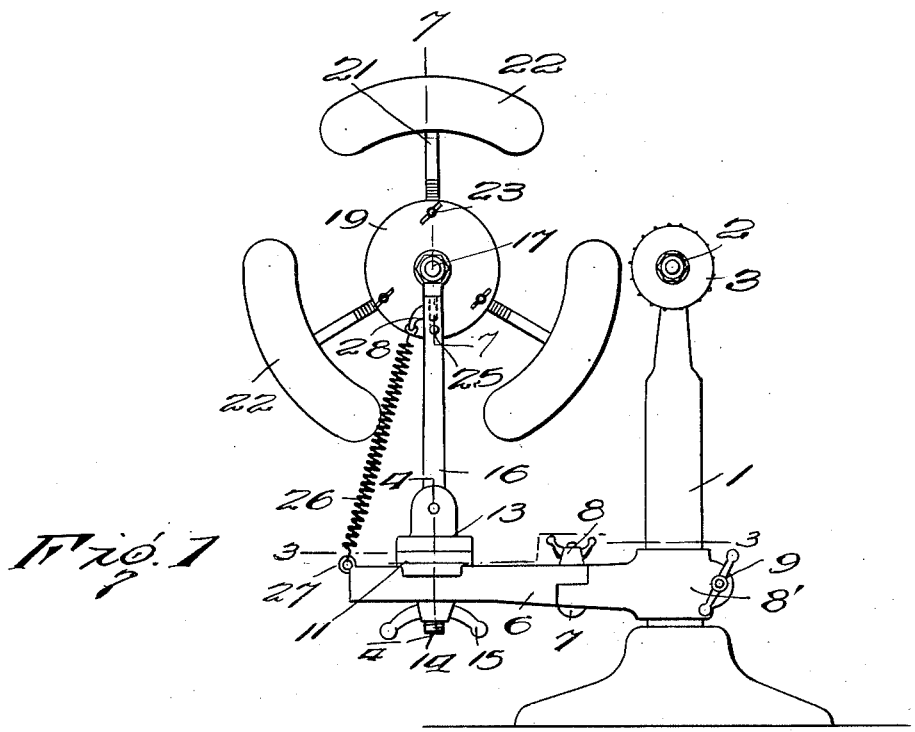

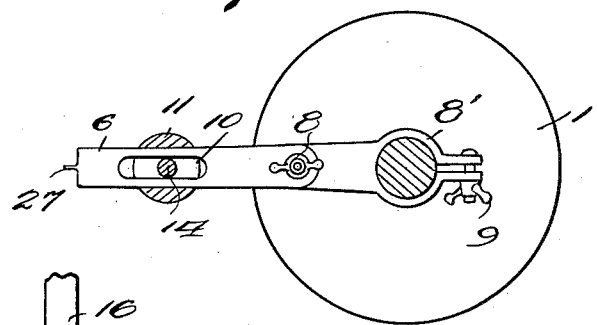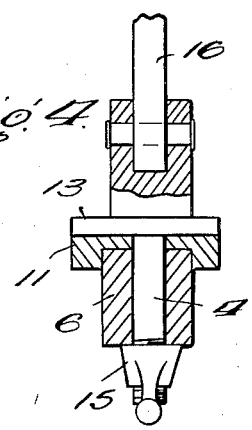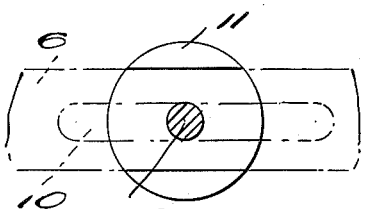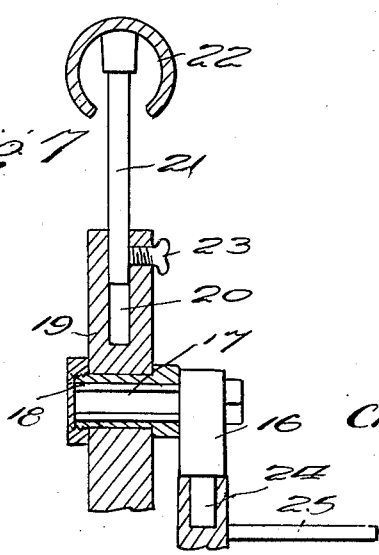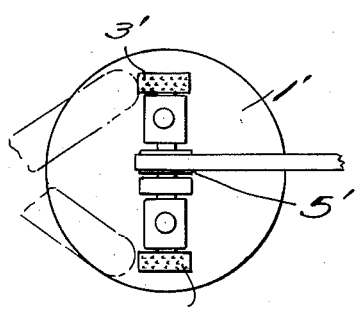

CHARLES L. DURHAM, OF SALINA, KANSAS.

TIRE-TREATING MACHINE.

1,341,500.  Specification of Letters Patent.  Patented May 25, 1920.

Application filed January 20, 1919. Serial No. 272,082.

*To all whom it may concern:*

Be it known that I, CHARLES L. DURHAM, a citizen of the United States, residing at Salina, in the county of Saline and State of Kansas, have invented certain new and useful Improvements in Tire-Treating Machines, of which the following is a specification.

This invention relates to improvements in tire treating devices or machines and it is the principal object of the invention to provide a tire buffing machine particularly adaptable for use in removing the old and worn tread portions of pneumatic tire shoes such as commonly used on motor driven vehicles from the carcasses or skeletons thereof in order that the same can be re-treaded by processes common in this art, thus prolonging the period of use of the tire shoe so treated and by consequence, effecting a material saving upon part of a user.

Another and equally important object of the invention is to provide a machine which is of such construction as will permit its operation by labor procurable at a cost much lower than that expended at the present time and which, will perform the work with equal accuracy and despatch.

Another object of the invention is to provide a device of the character mentioned which can be used in conjunction with practically any form of buffing, grinding or other type of tread removing machine or device, thus allowing its use purely as an attachment if so desired, in order that the devices or machines now marketed and employed for buffing, cutting or grinding operations, particularly, those types of machines now employed for removing old and worn tire shoe treads can be provided with the same without alteration.

Other objects will be in part obvious and in part pointed out hereinafter.

The invention consists, furthermore, in the novel arrangements and combinations of the parts of the device, as well as in the details of the construction of the same, all of which will be more fully described in the following specification and then finally embodied in the clauses of the claims which are appended to this specification and which form an essential part thereof.

The invention is clearly illustrated in the accompanying drawings, in which:—

Figure 1 is a side elevation of the machine,

Fig. 2 is a top plan view thereof,

Fig. 3 is a horizontal section taken on line 3—3 of Fig. 1,

Fig. 4 is a vertical section taken on the line 4—4 of Fig. 1,

Fig. 5 is a similar section taken at substantially right angles to the Fig. 4,

Fig. 6 is a fragmentary detailed horizontal section showing the engagement of one of the bearing plates with the supporting arm, Fig. 7 is a fragmentary section taken on the line 7—7 of Fig. 1, and Fig. 8 is a reduced top plan view of a slightly modified form of machine employing an abrasive brushing element.

Having more particular reference to the drawings, in connection with which like reference characters will designate corresponding parts throughout the several views, 1 represents the stand or similar support of a buffing or grinding machine, the upper portion of which is provided with bearing brackets 2 receiving the shaft therethrough carrying adjacent one end the abrasive wheel or element 3 while a loose and tight pulley 4 and 5 respectively are mounted on said shaft and as will be understood are adapted to be engaged by suitable belt gearing or other means for transmitting motion thereto from a driving device.

Connected to the lower portion of the stand 1 which in this particular instance, is circular in cross section, is a laterally extending supporting arm 6, said arm being formed in sections connected by a hinge joint 7 and provided with a suitable form of adjusting nut 8 whereby the same can be locked in relatively adjusted positions for a purpose which will be hereinafter described. One of the sections of the arm 6 is formed with a circular split sleeve 8' engageable about the lower portion of the stand 1 and provided with screw threaded ears receiving a connecting bolt therethrough which bolt is in turn engaged by an adjusting or locking nut 9. By reason of the connection of the arm 6 with the stand 1, it is quite obvious that rotary movement of said arm with relation to the stand can be effected and further, that the arm can be securely clamped in position against movement with relation to the stand when so desired merely by adjusting the wing nut 9.

The outer or free end of the arm 6 is formed with a longitudinal slot 10, the upper side thereof being flattened whereby to receive a bearing 11 formed with a way on its lower face, which way is adapted to receive the upper portion of the arm 6 therein; said disk 11 being formed with a centrally located opening. A bearing bracket 13 carrying a depending bolt 14 is arranged on the uppermost disk 12, said bolt 14 passing downwardly through the opening in the disk 11 through the slot 10 in the outer end of the arm 6 whereat it is engaged by a locking wing nut 15, which nut as will be noted is turned into engagement with the underside of the arm whereby to provide means for securing the bracket in adjusted positions with respect to the lateral arm 6. Thus, it follows that the bracket 13 is afforded sliding adjustment with respect to the arm 6 as well as rotary adjustment thereof with relation to said arm. The engaging surfaces of the disk 14 and the lower portion of the bracket 13 which as will be noted is circular, will afford an effectual form of clamping means when caused to engage by the tightening of the wing nut 15 on the bolt 14 and in consequence an effectual lock for preventing rotation of the bracket 13 with relation to the disk 11 will be provided.

Pivoted at its lower end to the bracket 13 is a standard 16 carrying a bearing element 17 on its upper end, which bearing element 13 adapted to removably receive a bearing sleeve 18 provided with suitable anti-frictional bearing means, common in the art, and being arranged in a hub member 19, said hub member having radially disposed sockets 20 formed therein for slidably receiving arms 21 carrying segmental tire rests 22. To permit of the securing of the arms and their respective tire rests 22 in adjusted position with relation to the hub portion 19, set screws 23 are turned into engagement with suitable openings formed in one side of the hub member 19 and bind on adjacent portions of the arms 21 arranged in the sockets in the hub member. Thus, the arms 21 can be adjusted radially with respect to the hub member for receiving tires of different diameters. The standard 16 is also formed in sections, namely, the lower section which is pivoted to the bracket 13 and the upper section carrying the bearing element 17, said upper section being formed with a depending pintle 24 which is received in a socket formed in the upper end of the lower section of the standard 16 and in this manner producing the usual swivel connection, whereby rotary motion of the tire receiving means including the arms 21 and the segmental rests 22 with relation to the lower portion of the standard can be effected, thus allowing the tread of a tire arranged on the rests to be properly engaged with the abrasive element 3.

A laterally extending arm 25 is also carried on the upper end of the lower section of the standard 16 and serves as a rest against which a portion of the body of an operator is brought to bear, in order that the standard can be rocked forwardly to such an extent as may be necessary to cause the engagement of the work supported on the rests 22 against the abrasive element 3.

As means for returning the standard 16 to its normally upright position when pressure on the rests 25 is released, I employ a contractile coil spring 26 or its equivalent, one end of which is engaged with a finger 27 arranged on the free end of the laterally extending arm 6 while the remaining end is connected to a portion of the hub member 19 as at 28. Obviously, when the standard 16 is rocked forwardly, the spring 26 will be placed under a tension and therefore when pressure on said standard is released, the spring will serve to return it to its normally upright position out of engagement with the abrasive element 3.

In the Fig. 8 I have shown a slightly modified form of grinding or buffing means for the machine, the same in this particular instance including a stand 1' having bearing brackets arranged on its upper end carrying a shaft 29 having an abrasive wheel 3' and a wire brush 33 or the like mounted on its opposite end; a drive pulley 5' being engaged with the middle portion of the shaft in order that suitable gearing can be engaged therewith for permitting the transmission of rotary motion thereto.

In operation of the form of invention first described, the diameter of the tire to be treated by the machine is first ascertained whereupon the arms carrying the tire rests 22 are adjusted to correspond thereto. At this time, the tire is engaged with the segmental rests and is connected thereto by moving the rests slightly outwardly to effect positive connection between the same and the tire. At this time, the set-screws 23 are engaged with the adjacent portions of the arms 21 working in slots in the hub member 19 to secure the same in their adjusted positions. At this time, rotary motion is transmitted to the abrasive element 3. Proper adjustment of the tire with relation to the abrasive element is now made through the hingedly jointed laterally extended arm 6, by moving the same to the desired position with relation to the stand 1 and by pivoting the outer or free section thereof to the desired extent, the arm being then locked in adjusted position by tightening the wing nuts 8' and 9 respectively. The standard 16 is now adjusted with relation to the abrasive element 3 by sliding the bolt 14 through the longitudinal slot 10 in the free end of the arm 6 whereupon the standard 16 can be then slightly rotated to effect proper alinement of the tire with the abrasive element. At this time, the locking nut 15 is tightened to prevent further movement between the elements so connected. The operator now grasps the tire mounted on the rests 22 and by bringing sufficient pressure to bear on the rest 25 causes the standard 16 to be swung forwardly by reason of its pivotal connection with the bracket 13. Obviously, the tire can be effectually adjusted in a horizontal plane with relation to the abrasive element 3 due to the provision of the swivel connection of the upper portion of the standard 16 to the lower portion or section thereof. In consequence, that section of the tread portion of the tire on the side adjacent the abrasive element can be removed therefrom in a manner to expose the carcass or skeleton of the tire. With this much of the worn tread portion of the tire shoe removed, the hub member 19 is then removed from the bearing element 18 and is reversed in its position thereon, hence, bringing the remaining portion of the old tire tread portion to a point in proximity to the abrasive element 3. At this time, the standard 16 is again rocked forwardly to engage the old worn tread portion of the tire shoe with the abrasive element and cause its removal therefrom. Obviously, when pressure is released upon the standard 16, the same will be returned to its normally upright position on the laterally extended arm 6 by reason of the connection of the contractile coil springs 26 therewith, thus bringing the tire out of engagement with the abrasive element and allowing it to be removed, adjusted or otherwise positioned. Of course, instead of removing and reversing the positioning of the hub member 18 on the bearing 17, the arm 6 can be swung entirely about the stand in order that the work supporting means thereon will be positioned with respect to the abrasive wheel so that the opposite or remaining side of the worn tread can be effectually engaged therewith.

In the Fig. 8 wherein there is provided an abrasive wheel and a brushing means, it will be understood that the tread of the old or worn tire subsequent to being removed can be then thoroughly brushed to remove the "friction" therefrom, that is, the particles of rubber adhering to the carcass merely by swinging the arm 6 to a position whereat the exposed tread portion of the carcass can be engaged with the rotary brush 3ª. In this connection, it of course will be understood that subsequent to the removal of the tread from an old or worn tire, the particles of rubber, commonly called "friction" in the art, must be necessarily removed to render the resetting of the tire efficient. This of course can be accomplished when the form of machine disclosed in the Fig. 1 is employed, by removing the tire therefrom and bringing the exposed portion of the carcass thereof into engagement with a suitable brush or other cleaning element. However, in the modified form, it will be appreciated that the time and labor required in the removing of the tire from the machine is dispensed with and in consequence, a material saving is effected upon part of a user, since, the tire when supported on the modified type of machine can be readily swung into engagement with the brush 3ª as stated. By reason of the sliding adjusting of the standard 16 on the laterally extending arm 6, it will be also understood that a tire arranged on the segmental rests 22 can be adjusted to such a nicety with relation to the abrasive element 3 or 3′ or with relation to the wire brush 3ª as the case may be so as to insure proper removal of the old and worn tread portion therefrom and the removal of the "friction" from the exposed portion of the tire proper.

With my improved tire treating machine, it is evident that I will be enabled to remove the old and worn tread portion of a tire in an even and uniform manner, leaving the side walls of a tire intact and dressing the upper portions thereof in a manner to permit the joining of a new tread thereto by dry curing or similar processes common in the art in a manner such as will afford a practically new tire, in so far as the period for which the same may be used is materially lengthened.

As hereinbefore stated, the machine will serve as a means for materially reducing the cost of labor heretofore required for the re-treading of pneumatic tire shoes, my machine being capable of being operated by unskilled labor and labor which can be procured at a cost much lower than that heretofore required, without sacrificing any of its advantageous features. Furthermore, the device may be used purely in the nature of an attachment. By reason of the provision of the laterally extending arm which is provided with the split clamping sleeve, the device can be attached to and used successfully in conjunction with buffing, cutting or grinding machines of any types or designs such as are now commonly used in the treating of tire treads previous to the re-treading of the same.

Manifestly, the construction shown is capable of considerable modification and such modification as is within the scope of the claims, I consider within the spirit of the invention.

I claim:

1. A device of the character described including a horizontally adjustable supporting arm, a bracket slidably secured to one portion of said arm and adjustable longitudinally thereof, said bracket also being capable of having rotary adjustment with relation to the arm, a standard pivoted to the bracket, and a rotatable adjustable tire supporting means secured to and capable of having other rotary adjustments in a horizontal plane with relation to the standard.

2. A device of the character described including a horizontally adjustable supporting arm, a slidably and rotatably adjustable bracket secured to said arm, a standard pivoted to said bracket formed in sections, the uppermost of said sections being swivelly connected to the lowermost of the sections, means engaged with the standard and with the arm for normally maintaining the same in an inoperative position, and adjustable rotary tire supporting means mounted on the swivelly connected upper portion of said standard.

3. A device of the character described comprising a stand, a support extending laterally from the stand and adjustable vertically thereon, buffing means on the stand, a standard carried by the support, means swingingly supporting the standard and permitting adjustment thereof longitudinally of said support, and a rotatable tire supporting member mounted to revolve upon the standard and adapted to be operatively positioned relative to the buffing means by the standard.

4. A device of the character described comprising a stand, a support, extending laterally from the stand and adjustable vertically thereon, buffing means on the stand, a standard carried by the support, means swingingly supporting the standard and permitting adjustment thereof longitudinally of said support, and a rotatable tire supporting member mounted to revolve upon the standard and adapted to be operatively positioned relative to the buffing means by the standard, and means to normally retract said standard to hold the tire supporting member in inoperative position.

5. A device of the character described, comprising a stand, a support vertically adjustable on the stand and having a swinging section, means for locking the swinging section in adjusted position, a standard, means adjustably connecting the standard to the swinging section of said support and permitting swinging movement of said standard, a tire supporting means, a bracket pivoted to the standard and rotatably connecting the tire supporting means thereto, and buffer means carried by the stand.

6. A device of the character described, comprising a stand, a support vertically adjustable on the stand and having a swinging section, means for locking the swinging section in adjusted position, a standard means adjustably connecting the standard to the swinging section of said support and permitting swinging movement of said standard, a tire supporting means, a bracket pivoted to the standard and rotatably connecting the tire supporting means thereto, buffer means carried by the stand, and resilient means active upon the standard to normally hold the same in a position for spacing the tire supporting means from the buffing means.

In testimony whereof, I affix my signature hereto.

CHARLES L. DURHAM.